Sept. 5, 1967          T. BUDZICH          3,339,660
HYDROSTATIC MECHANISM
Filed Sept. 14, 1964          2 Sheets-Sheet 1
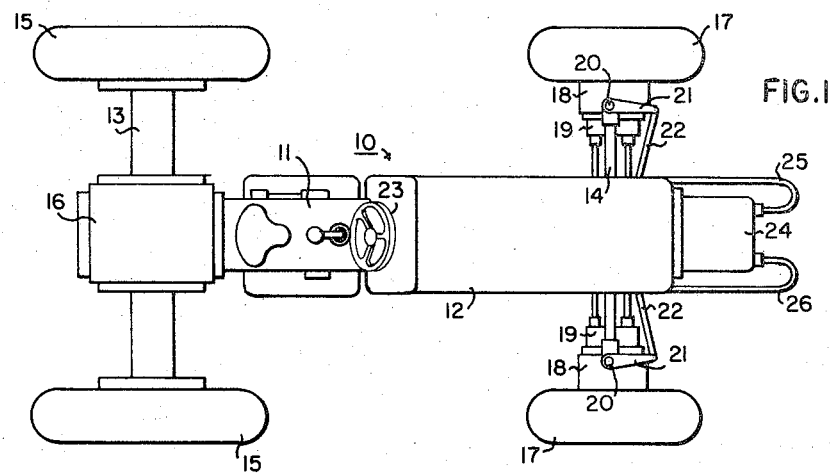
FIG.1
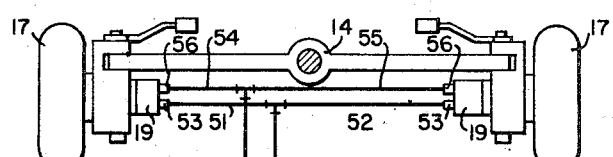
FIG.2
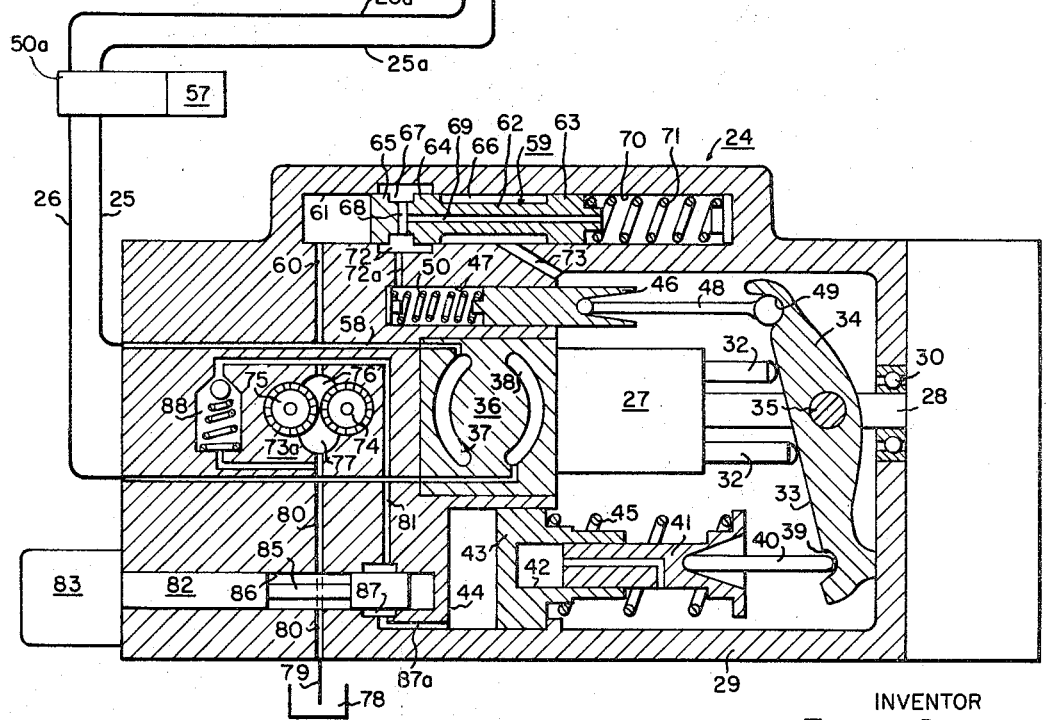
INVENTOR
TADEUSZ BUDZICH
BY William N. Hogg
ATTORNEY Sept. 5, 1967 T. BUDZICH 3,339,660
HYDROSTATIC MECHANISM
Filed Sept. 14, 1964 2 Sheets-Sheet 2

INVENTOR
TADEUSZ BUDZICH
BY William N. Hogg
ATTORNEY

United States Patent Office

3,339,660
Patented Sept. 5, 1967

3,339,660
HYDROSTATIC MECHANISM
Tadeusz Budzich, 80 Murwood Drive,
Moreland Hills, Ohio
Filed Sept. 14, 1964, Ser. No. 396,047
48 Claims. (Cl. 180—44)

This invention relates generally to fluid motors and to power drives of self-propelled vehicles and more particularly to motors and hydrostatic drives for the front wheels of tractors, self-propelled farm machinery, earth moving equipment and the like.

In still more particular aspects this invention relates to variable displacement fluid motors and to synchronization controls of fluid front axle drives, using such variable flow motors and an automatic pressure responsive variable pump control.

A front axle fluid power drive, using fluid motors supplied by a variable displacement pump, controlled by automatic pressure responsive control, which varies the pump displacement to maintain a constant system pressure, will develop a constant torque at the fluid motors. The fluid motors of such a drive which are normally pivotally mounted on the steering wheels and drivingly engaged therewith, will automatically synchronize their driving effort with the mechanical transmission, which supplies power to the rear wheels.

Prior art front axle synchronizing fluid drives of this type have utilized, in combination, a variable flow pump and fixed displacement motors. In such a transmission circuit, with front wheel drive disengaged, clutches must be provided between fluid motors and the steering wheels to prevent excessive circulation losses of the fluid within the fluid motors themselves. Also, with such a drive, at higher driving speeds, when the flow demand of the fluid motors exceeds the maximum capacity of the variable flow pump, the fluid drive will automatically stop transmitting power and torque to the front wheels. Further, under the unloaded conditions the fluid is circulated through the transmission lines at a very high rate, and therefore, high circulation losses will take place with the associated high rate of parasitic heat generation. To extend the useful speed range of the hydrostatic drive using fixed displacement motors either excessively large variable flow pumps must be used or the size of the fluid motors reduced. Neither of these steps would provide an ideal solution. A large pump is not only expensive but it would perform most of its work in a low range of its output, where its efficiency is low. Furthermore, this excessive pump capacity is only used at high speeds, where the power requirements of some types of vehicles are quite low. However, even if a pump of sufficient capacity could be provided to cover the full speed range of the vehicle, the above fluid drive, because of its basic characteristics, would still have the following disadvantage. Since such a drive develops constant torque at the fluid motors, the horsepower output of this drive will then be directly proportional to the vehicle surface speed. This is a very undesirable characteristic in drive applications for farm machinery, earth moving equipment, industrial tractors, etc. In these vehicles the higher driving speeds are utilized for transport purposes, where the vehicle is not performing any additional work and where the power requirements are comparatively low.

The alternative step of reduction of the size of the fixed displacement motor, to extend the useful operating range of the transmission, carries the obvious disadvantage of reduced effectiveness of the drive under conditions of high torque demand.

In some applications of an auxiliary hydrostatic drive, the reversing feature of the drive becomes a necessity. With fixed displacement motors flow reversing devices such as conventional four way valves must be used. In these reversing applications both of the motor ports can be subjected to high pressure fluid, thus necessitating expensive high pressure flexible lines leading to both motor ports.

It is therefore a principle object of this invention to provide a synchronized fluid drive which will permit transmission of power, from a variable flow pump to fluid motors, throughout the entire range of vehicle surface speeds, permitting the drive to effectively work at speeds higher than those equivalent to the maximum flow of the pump.

Another object of this invention is to provide a fluid power synchronizing drive which on reaching the maximum variable pump capacity will automatically extend its useful range of operation, at higher surface speeds, while working in the zone of relatively constant horsepower output and maintain these characteristics until the maximum rotational speed potential of the fluid motors is reached.

Still another object of this invention is to provide a fluid power synchronizing drive in which there are minimum circulation losses, such minimum losses being achieved without the use of clutches between the fluid motors and driving wheels.

A further more specific object of this invention is to provide a fluid power synchronizing drive in which the motors have a variable displacement and the displacement will automatically be brought to zero once the variable pump is unloaded, thus eliminating the necessity of clutches between fluid motors and driving wheels.

Yet another object of this invention is to provide a fluid power synchronizing drive which will permit the reversal of direction of the drive without use of flow reversing controls.

An additional object of this invention is to provide a fluid power synchronizing drive in which reverse of direction of rotation of fluid motors is accomplished within the fluid motor itself without reversing the polarity of the motor ports.

Still a further more particular object of this invention is to provide a fluid power synchronizing drive in which the reversal of direction of rotation of fluid motors is accomplished within the motor, therefore requiring only one high pressure fluid conducting flexible line.

Still an additional object of this invention is to provide, in a fluid power synchronizing drive, fluid motors which will vary their displacement and therefore their torque output automatically in respect to the system pressure, thus extending useful operational range of the drive into high surface speeds of the vehicle.

Yet another more general object of this invention is to provide improved variable fluid motors.

Yet another object of this invention is to provide a variable fluid motor which will vary the torque output in respect to a given system pressure and changing speed.

A still further object of this invention is to provide a variable fluid motor which will automatically adjust its displacement with change in system pressure.

Still another object of this invention is to provide a variable fluid motor which will automatically adjust its torque and speed output in response to a predetermined change in system pressure.

Still another object of this invention is to provide a variable fluid motor which will automatically adjust its torque and speed output in response to a predetermined change in system pressure in the zones of both forward and reverse rotation.

Still another object of this invention is to provide a variable fluid motor equipped with automatic control to vary the motor torque and speed output in respect to change in system pressure in the zones of both forward and reverse rotation, the change of direction of rotation of the motor being accomplished within the displacement changing mechanism without changing the polarity of the motor ports.

Further objects and advantages of this invention will become apparent from the following description and drawings in which:

FIGURE 1 is a plan view somewhat schematic of a tractor showing the mounting of fluid motors and a representative mounting of a fluid pump according to this invention;

FIGURE 2 is a somewhat schematic representation of the fluid drive components of this invention with variable displacement pump and pump control components shown somewhat diagrammatically;

Figure 3:
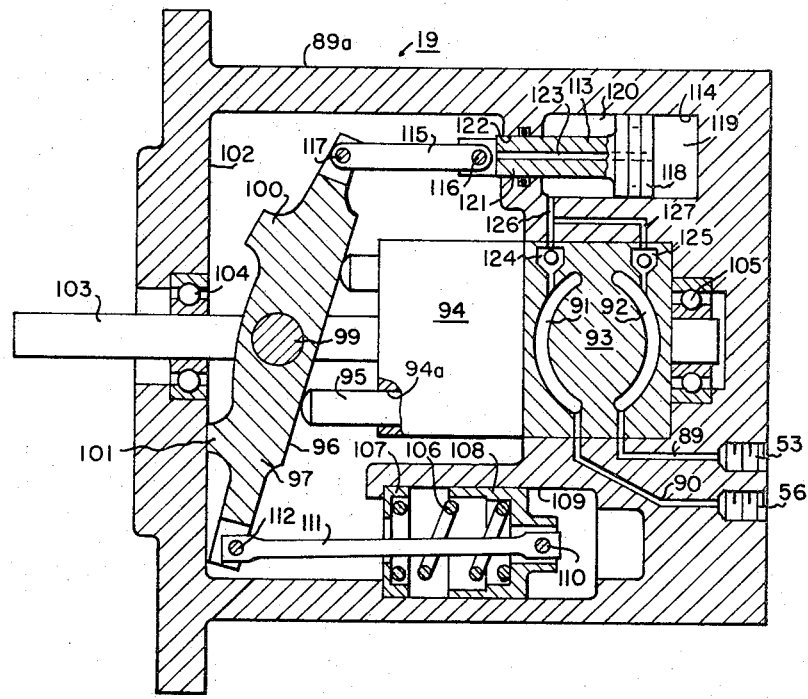
FIGURE 3 is a sectional view of one embodiment of a variable displacement fluid motor of this invention.

Although the invention has broader applications, it will be described hereinafter in specific relation to a tractor, which presently constitutes the preferred use.

Referring now to the drawings and for the present to FIGURE 1, a tractor generally designated as 10 comprises a frame 11 mounting an engine 12, a back axle 13 and a front axle 14. Rear wheels 15 are mounted on back axle 13 and are drivingly connected with engine 12 by a conventional mechanical transmission 16. Steering front wheels 17 are provided and are equipped with a mechanical gear reducer 18 mounting fluid motors 19. The combination of the front steering wheels 17, gear reducers 18 and fluid motors 19 are pivotally mounted by king pins 20 in respect to front axle 14. A conventional steering arm 21 through a tie rod 22 connects the front steering wheels 17 to tractor steering wheel 23. A variable flow pump, generally designated as 24, is driven by the engine 12 and is connected though flexible ducts 25 and 26 to fluid motors 19. As shown in FIGURE 1, the variable flow pump 24 is directly mounted on the engine although it can be mounted at any suitable power take-off position.

Referring now to FIGURE 2, the variable flow pump 24 is shown with its working components and controls diagrammatically disposed. The pump 24 includes a pump housing 29 in which a cylinder barrel 27 is rotatably mounted. The rotary motion from engine 12 is transmitted to the cylinder barrel 27 by a shaft 28, journalled in the pump housing 29 by bearing 30. The cylinder barrel 27 is provided with cylinder bores (not shown) reciprocably guiding pistons 32, which pistons abut reaction surface 33 of a trunnion 34. The trunnion 34 is mounted for limited rotation in respect to pump housing 29 by trunnion pin 35. The cylinder barrel 27 abuts valve plate 36 (diagrammatically shown rotated 90° for clarity of explanation), which valve plate has a high pressure kidney shaped timing port 37 and a low pressure kidney shaped timing port 38.

The trunnion 34 has an internal part-spherical surface 39 engaging a first push rod 40, which push rod engages a spring guide 41. The spring guide 41 is slidably disposed in an axial bore 42 formed in an unloading piston 43. The unloading piston 43 is slidably mounted in an unloading bore 44 formed in the housing 29. A control spring 45 is interposed between the spring guide 41 and unloading piston 43 and through push rod 40 biases the trunnion 34 toward the position of its maximum angular inclination and thus maximum pump output.

A control piston 46 is provided which is guided in a control bore 47 formed in the pump housing 29. The control piston 46 engages a second push rod 48 which in turn engages a second internal spherical surface 49 formed in the pump trunnion 34. The control bore 47 contains a reaction spring 50 normally biasing the control piston 46 and push rod 48 toward engagement with trunnion 34.

The high pressure timing port 37 and low pressure timing port 38, of the variable pump 24, are connected through flexible ducts 25 and 26 to a conventional four way reversing valve 50a. The reversing valve 50a is connected through flexible duct 25a and ducts 51 and 52 to motor ports 53 and through flexible ducts 26a and ducts 54 and 55 with motor ports 56. The four way valve 50a is operated by solenoid 57.

A passage 58 is provided in the housing 29 which conducts pressure fluid from the high pressure timing port 37 to passage 60 which communicates with bore 61 of automatic pressure responsive pump control 59. The bore 61 of the pump control 59 slidably guides a control spool 62. The control spool 62 is equipped with lands 63, 64 and 65, defining therebetween annular spaces 66 and 67 respectively. Annular space 67 is connected through cross passage 68 and longitudinal passage 69 with space 70 at the remote end of bore 61. A valve spring 71 is interposed between control spool 62 and the housing of automatic pressure responsive pump control 59. The bore 61 is interrupted by annular ring 72, which through passage 72a formed in the housing 29 communicates with the control bore 47. Annular space 66 communicates through passage 73 with low pressure zone of the pump, within its interior.

A fixed displacement gear pump, generally designated as 73a is provided which has a driving gear 74 and driven gear 75. The driving gear 74 is drivingly connected to shaft 28. The gear pump 73a has an outlet port 76 and an inlet port 77. The inlet port 77 is connected to diagrammatically shown reservoir 78 by line 79 and passage 80. The outlet port 76 communicates through passage 81 and 87a with the unloading bore 44. An unloading valve spool 82, operated by solenoid 83 is provided and has a reduced diameter control portion 85. Unloading spool 82 is slidably guided in bore 86, provided with a circumscribing annular ring 87, which communicates with unloading bore 44 through passage 87a. A conventional relief valve 88 functionally interconnects passages 81 and 80 and therefore high and low pressure ports 76 and 77 of gear pump 73a.

Referring now to FIGURE 3, the fluid motor 19 is shown with some of its working components diagrammatically disposed. The motor 19 includes a housing 89a having motor ports 53 and 56 connected through passages 89 and 90 with timing ports 91 and 92 of valve plate 93 (which is diagrammatically shown rotated 90° for clarity of explanation). A cylinder barrel 94 rotatably mounted in housing 89a abuts valve plate 93 and slidably guides in piston bores 94a, pistons 95, which in turn abut reaction surface 96 of motor trunnion 97. The motor trunnion 97, is mounted for limited rotation, in respect to motor housing 89a, by trunnion pins 99. Motor trunnion stops 100 and 101 are provided which in combination with surface 102 of motor housing 89a limit the angular travel of motor trunnion 97. The stop 101 limits the maximum angle of the inclination of the motor trunnion 97, while stop 100 becomes engaged when the reaction surface 96 becomes normal to the axis of rotation of the cylinder barrel 94. The motor cylinder barrel 94 is drivingly connected to motor shaft 103, which is journalled in respect to motor housing 89a by bearings 104 and 105. A motor spring 106 is mounted in a spring retainer 107 and spring guide 108. The spring guide 108, slidably guided in a bore 109, is connected through pin 110 to a connecting rod 111, which in turn through pin 112 engages the motor trunnion 97. A reaction piston 113 slidably guided in reaction piston bore 114, through connecting rod 115 and pins 116 and 117 is connected to motor trunnion 97. The reaction piston 113 has a head 118, functionally dividing the piston bore 114 into spaces 119 and 120. The piston 113 also includes a stem 121, guided in bore 122. A drilled passage 123 connects space 119 with the low pressure zone contained within motor housing 89a. Motor ports 91 and 92, through check valves 124 and 125 and passages 126 and 127, are functionally connected with the space 120.

Figure 4:
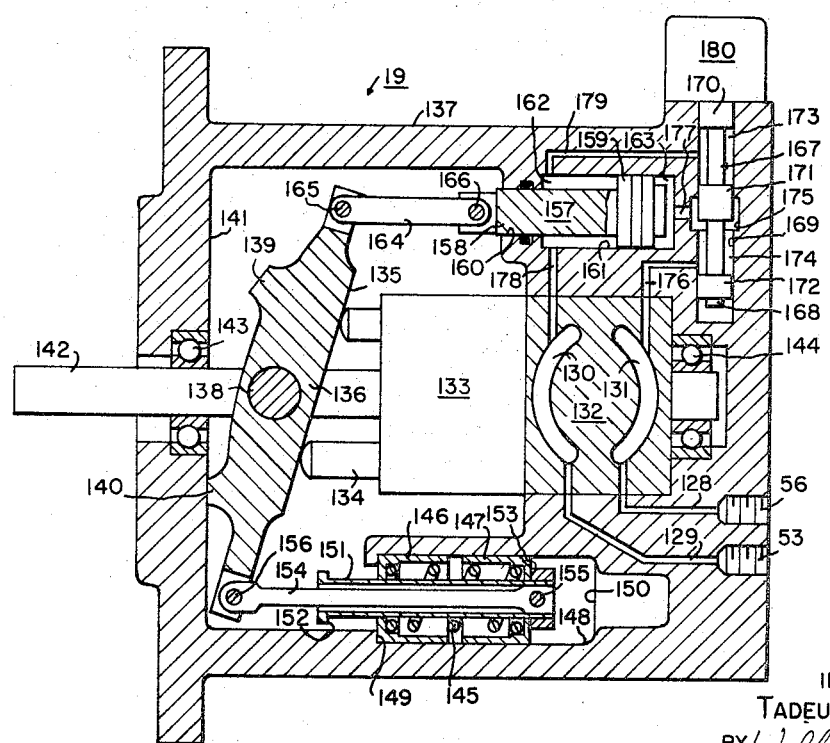
FIGURE 4 is a sectional view of another embodiment of a variable displacement fluid motor of this invention.

Referring now to FIGURE 4, the fluid motor 19 is shown with some of its working components diagrammatically disposed. The high pressure inlet port 53 and low pressure outlet port 56 are connected through passages 128 and 129 with timing ports 130 and 131, of valve plate 132, (which is diagrammatically shown rotated 90° for clarity of explanation). Cylinder barrel 133 abuts the valve plate 132 and slidably guides in piston bores (not shown) pistons 134. Pistons 134 with their spherical ends operationally engage reaction surface 135 of motor trunnion 136. The motor trunnion 136 is mounted for limited rotation in respect to motor housing 137 by trunnion pins 138. Motor trunnion stops 139 and 140, in combination with surface 141, of motor housing 137, limit the maximum angle of inclination of motor trunnion 136 each side of center. The motor cylinder barrel 133 is drivingly connected to motor shaft 142, which is journalled in respect to the motor housing 137 by bearings 143 and 144. A motor spring 145 is located within spring guides 146 and 147, which are slidably guided in bore 148. This constitutes a spring assembly. The bore 148 terminates in stops 149 and 150, which limit travel of the spring guides 146 and 147. The spring guides 146 and 147 slidably guide spring tube 151, equipped with stops 152 and 153. A connecting rod 154 is located within spring tube 151, engaging it with limited freedom of rotation through pin 155. The connecting rod 154 is connected to the motor trunnion 136 by pin 156. A reaction piston 157 is provided and is connected by connecting rod 164 and pins 165 and 166 to the motor trunnion 136. The piston 157 has a stem section 158 and head section 159. The stem section 158 is guided in bore 160 and the head section 159 is guided in bore 161. The bore 161 is functionally divided by head section 159 into spaces 162 and 163. A reversing valve, generally designated as 167, is provided and includes a spool 168, slidably guided in a valve bore 169. The spool 168 has lands 170, 171, and 172, defining annular spaces 173 and 174. The valve bore 169 is equipped with an annular ring 175. The annular space 174 is connected through passage 176 to low pressure timing port 131. The annular ring 175 is connected through passage 177 to space 163. The space 162 is connected by passage 178 to the high pressure timing port 130 and passage 179 to the annular space 173. The spool 168 is selectively operable by solenoid 180.

With respect to the operation of the apparatus hereinabove described, and particularly with reference to FIGURE 2, rotary motion from the engine 12 is transmitted by the shaft 28 to cylinder barrel 27 and causes pistons 32 to reciprocate as they follow the inclined reaction surface 33 of trunnion 34. This reciprocating motion will induce a pumping action within the cylinder barrel 27, and the fluid, in a well known manner, is phased by the high pressure timing port 37 and low pressure timing port 38 of the valve plate 36. The magnitude of the pressure flow, generated within the cylinder barrel 27, is proportional to the angle of inclination of the reaction surface 33 of trunnion 34, in respect to axis of rotation of shaft 28. With the reaction surface 33 perpendicular to axis of rotation of the pump, the pump flow becomes zero; with a maximum angle of inclination, as shown in FIGURE 2, the pump volume output becomes maximum. Control of fluid flow is accomplished by changing the angle of inclination of the trunnion 34, the angle being regulated by the action of the control spring 45, control piston 46, and automatic pressure responsive pump control 59. The control spring 45, acting through the spring guide 41 and push rod 40, biases the trunnion 34 toward the maximum pump flow position. A pressure signal, supplied from automatic pressure responsive control 59, transmitted through passage 72a to control bore 47, will react on the cross-sectional area of control piston 46, applying force thereto. This force, transmitted to trunnion 34, by push rod 48, will act in opposition to the bias of the control spring 45 (which is maintained in a preloaded position by unloading piston 43) and rotate the trunnion 34 around trunnion pin 35 toward the position of zero pump displacement. The automatic pressure responsive control 59 is arranged to supply a modulated control signal, which will vary the angle of inclination of trunnion 34 and therefore volume output of the pump, to maintain a relatively constant high pressure timing port 37. The modulation of the automatic pressure responsive control 59 is accomplished in the following way. Relatively high fluid pressure, conducted from the high pressure timing port 37, through passages 58 and 60 reacts on cross-section area of control spool 62, urging it from left to right (as viewed in FIGURE 2) against the biasing force of the valve spring 71. At a certain pressure level, as set by the preload in the valve spring 71, the control spool 62 will move from left to right, connecting annular space 67 with the high pressure fluid. The rising pressure in the annular space 67, transmitted through passages 68 and 69 to space 70, will react on the cross-section area of the control spool 62, supplementing the biasing force of valve spring 71 and moving the control spool 62 from right to left (as seen in FIGURE 2) effectively isolating annular space 67 from the high pressure fluid. In this way, under influence of the above forces, the control spool 62 will continuously seek a condition of floating equilibrium, maintaining a pressure level in the annular ring 72 and space 70, proportional to fluid pressure in timing port 37 above pressure level set by the preload in the valve spring 71. A rise in the fluid pressure in the high pressure timing port 37, above the level equivalent to preload in the valve spring 71, will move the control spool 62 effectively raising the pressure in annular ring 72. A drop in the fluid pressure below the level equivalent to preload in the valve spring 71 will connect annular ring 72 with annular ring 66 and through passage 73, to low pressure zone, contained within the pump housing 29. A change in the pressure in the annular ring 72, modulated by the automatic pressure responsive pump control 59, will be transmitted to passage 72a and therefore to the control bore 47. This modulated pressure signal, reacting on the cross-section area of the control piston 46, working in conjunction with biasing force of control spring 45, will regulate the angular inclination of trunnion 34 and therefore the volume flow of the pump, to maintain a relatively constant fluid pressure in the high pressure timing port 37. The fluid, at relatively constant pressure, is conducted from high pressure timing port 37, through the flexible duct 25, to a conventional four way reversing valve 50a, operable by solenoid 57. This type of valve is well known in the art and can selectively reverse the polarity of its outlet and inlet ports, diverting the high pressure fluid either to flexible duct 25a and therefore to motor ports 53 or to the flexible duct 26a and therefore motor ports 56. The high pressure fluid, after performing work in motors 19, is returned at lower pressure level from the four way reversing valve 50a, through flexible duct 26 to low pressure timing port 38, of the variable pump 24. The pump 24 can be unloaded by actuating solenoid 83 which will move the spool 82 to the right as seen in FIGURE 2. This will connect bore 44 with the reservoir 80. This will unload the piston 43 and under the action of the spring 50 and the control spring 45 the trunnion will be moved to a position normal to the axis of rotation of the pump.

Referring now to FIGURE 3, assume that the four way reversing valve 50a, under the action of solenoid 57, connects the high pressure fluid from timing port 37 to motor port 56. The high pressure fluid will then be conducted through passage 90 to high pressure timing port 91 of motor 19 and from there, in a well known manner, the high pressure fluid is going to be phased into the cylinder bores of the cylinder barrel 94. The forces, generated within the cylinder barrel 94, reacting against pistons 95 and transmitted to the inclined reaction surface 96, will be transmitted to the motor shaft 103, thus inducing rotary motion. The high pressure fluid, within the cylinder barrel 94, after performing work will be phased into the motor's low pressure timing port 92 and conducted from there, by passage 89, to motor port 53. Assuming a constant pressure in the high pressure motor timing port 91 and a constant maximum angle of inclination of the motor trunnion 97, as shown in FIGURE 3, the motor 19 will develop a constant torque at its shaft 103. Since the variable flow pump is equipped with a control as previously described which will maintain a constant pressure at the motor inlet port 56, the motor 19 will develop a constant torque, as long as the motor trunnion 97 remains at any constant specific angle of inclination. Assuming that a constant flow of pressure fluid, at constant pressure is supplied to the motor port 56, a change in angle of inclination of the motor trunnion 97 will change both the torque output and the speed of rotation of the motor shaft 103. An increase in angle of inclination, of the motor trunnion 97, will proportionally increase the motor torque output and proportionally decrease the motor output speed. Conversely a decrease in the trunnion angle will proportionally decrease the motor torque output and increase the motor speed; and, when the motor trunnion is in a position perpendicular to the axis of rotation of the shaft 103 the motor output torque will become zero. Under these conditions the device becomes inoperative as a motor, since at a constant flow input to the motor port 56, the motor shaft 103 would have to reach an infinite speed. Therefore when moving motor into the zone of operation, where the trunnion angles are becoming small, because of well known aspects of the friction, developed in rotating machinery, the limit of proportionality between the torque and speed of hydraulic motors is lost. It can be stated, in general, that under conditions of constant pressure and constant flow at motor port 56 and therefore under the condition of constant horsepower input into the motor, the horsepower output at the motor shaft 103 will remain approximately constant although the change in angle of inclination of the trunnion will vary the relationship between torque and speed, available at the motor output shaft 103.

With the angle of inclination of the motor trunnion remaining, as shown in FIGURE 3, and with the polarity of the motor timing ports 91 and 92 reversed by the four way valve 50a, the output shaft 103 will change its direction of rotation. The motor trunnion 97, pivoted for limited rotation around trunnion pin 99, under the action of motor spring 106, will tend to assume a position in which the reaction surface 96 becomes perpendicular to the axis of rotation of the shaft 103, with trunnion stop 100 engaging surface 102. This turning moment, supplied to trunnion 97 from motor spring 106 through connecting rod 111, is opposed by a moment supplied to the trunnion 97 from reaction piston 113, through connecting rod 115. Assuming that the timing port 91 is the high pressure port, the fluid under pressure will be conducted through check valve 124 and passage 126 to space 120. The high pressure fluid, conducted through passage 127 will close the check valve 125, thus effectively isolating the high pressure fluid from low pressure timing port 92. Conversely, with the timing port 92 becoming a high pressure port, in a similar manner, the high pressure fluid is conducted to space 120, the check valve 124 isolating the high pressure fluid from the timing port 91. The high pressure fluid in the space 120 will generate a force on the reaction piston 113, equal to product of pressure and difference between cross-section areas of head portion 118 and stem portion 121. The effective differential area of the reaction piston 113 is so selected that at the control pressure level of the variable displacement pump, the force generated on reaction piston will be just sufficient to overcome the moment of the motor spring 106 and bring the motor trunnion 97 into angular inclination as shown in FIGURE 3, with trunnion stop 101 engaging surface 102. Therefore as long as the variable flow pump will supply pressure fluid, at control pressure, to motor port 56, the motor trunnion will remain at its maximum angular inclination, in a position equivalent to the maximum torque output at the motor shaft 103. With the motor port 53 becoming the high pressure port, the direction of rotation of the motor shaft 103 will be reversed, the motor trunnion 97 remaining in the same position, as shown in FIGURE 3. Therefore, the motor displacement changing mechanism and motor controls will not be affected by change in polarity of the motor ports.

As previously described, the motor trunnion 97 will remain at its maximum angular inclination, as long as high pressure fluid, at a constant pressure level, is supplied to the motor ports. Therefore as long as the variable flow pump works within its maximum capacity of the flow changing mechanism, the fluid motor will remain in position of maximum displacement. However, once the demand of the fluid motors exceeds the maximum capacity of the variable flow pump, the pressure at the motor ports will drop. This drop in fluid pressure will sufficiently reduce the force generated at the reaction piston 113 to permit the motor spring 106 to rotate the motor trunnion 97 in a counter-clockwise direction, thus reducing its angle of inclination in respect to the axis of rotation of the shaft 103. This will result in an increase of motor shaft r.p.m. without an increase in the volume flow of pressure fluid supplied to the fluid motors. In this way, once the flow demand of the fluid motors exceeds the capacity of the pump, the motors automatically will start reducing their displacement, while the variable pump is working at its maximum capacity. Thus, the variable flow motor, as shown in FIGURE 3, in combination with previously described automatic pump control will provide a system, which at a constant output torque level will increase the horsepower output, transmitted to the front tractor wheels up to the point where the maximum pump capacity is reached. Past this point this system will transmit a constant horsepower, automatically reducing the motor displacement, therefore reducing the torque available at the motor shaft, while increasing the motor output r.p.m. The above fluid transmission system will maintain its characteristics both in forward and reverse zone of operation of the variable displacement fluid motors. In the event of variable displacement pump being unloaded, by a signal supplied to solenoid 83, the pump will be brought into a condition of zero flow and zero pressure. The resulting loss of fluid pressure at the motor ports will permit the motor spring 106 to bring the trunnion 97 into the position equivalent to zero motor displacement. In this condition the fluid motors become unloaded. Under these conditions a rotation of shaft 103 and therefore cylinder barrel 94 will not induce any flow circulation within the fluid motors and fluid transmission system, thus eliminating necessity of placing clutches between the motor shaft and the wheel.

The fluid motor, shown in FIGURE 4, basically performs in a way as described when referring to motor shown in FIGURE 3. However, it offers certain additional advantages. When phasing variable fluid motor of FIGURE 4 into fluid power transmission system shown in FIGURE 2, the bulky and expensive four way reversing valve 50a can be completely dispensed with, while still retaining features of the reverse driving. The pressure fluid, at controlled pressure level, is supplied from the variable flow pump to the inlet port 53, of variable displacement fluid motor shown in FIGURE 4. The pressure fluid is conducted from inlet port 53 through passage 129, motor timing port 130 and passage 178 to space 162. Since the space 163 is opened through passage 177, annular ring 175, annular space 174 and passage 176 to low pressure timing slot 131, a force will be generated on the effective area of the reaction piston 157, tending, through connecting rod 164 to rotate the motor trunnion 136 in a clockwise direction, toward maximum trunnion inclination in one direction, as shown in FIGURE 4. Movement of the reversing valve spool 168 downward, from the position as shown in FIGURE 4, with land 171, will isolate space 163 from the low pressure timing port 131 and connect the space 163 through passage 177, annular ring 175, annular space 173, passages 179 and 178 to high pressure timing port 130. Then the space 162 and space 163 are subjected to the high pressure fluid, resulting in the generation of a force equal to product of the fluid pressure and cross-section area of stem section 158 of reaction piston 157. This force will tend to induce anti-clockwise rotation in the motor trunnion 136, bringing it into overcenter position to a maximum inclination in the other direction with stop 139 working in contact with surface 141. Rotation of trunnion 136 to this position, as previously described, will reverse direction of rotation of the motor shaft 142.

The cross-section area of head section 159 is selected to be twice the cross-section area of the stem section 158, of the reaction piston 157. In this way force generated on the unbalanced area of the reaction piston 157, with space 162 subjected to high pressure fluid and space 163 to the low pressure fluid and tending to move reaction piston 157 from left to right, will equal the force generated on unbalanced area of the reaction piston 157. With spaces 162 and 163 both subjected to high pressure the reaction piston 157 will have a tendency to move from right to left. In this way by connecting space 163 either to the timing port 130 or 131, equal but opposite turning moments will be transmitted from reaction piston 157, through connecting rod 164 to motor trunnion 136. These forces and turning moments are opposed in both directions by the bias of the motor spring 145. The motor spring 145, in absence of forces transmitted from reaction piston 157 will expand from the position as shown in FIGURE 4, bringing the spring guide 147 in contact with stop 150 and spring guide 146 in contact with stop 152, of spring tube 151. This will result in anti-clockwise rotation of motor trunnion 136 to a position where the reaction surface 135 becomes perpendicular to the axis of rotation of motor shaft 142, with motor displacement becoming zero. From this position, counter-clockwise rotation of motor trunnion 136 will start compressing motor spring 145 until stop 139 touches surface 141 and the motor reaches maximum displacement position in the zone of its reverse rotation. From the neutral vertical position, i.e., a position normal to the motor axis of rotation, rotation of the motor trunnion 136 in a clockwise direction will again start to gradually increase bias of the motor spring 145, until the stop 140 reaches the surface 141, as shown in FIGURE 4. As in motor of FIGURE 3, the preload in the motor spring 145 is so selected that fluid pressure supplied from the pump, at the control level, will be able to generate on reaction piston 157 force higher than bias of the spring 145 and bring the motor trunnion 136 to maximum motor displacement position on either side of the center line. The variable motor will be maintained in this position, equivalent to its maximum torque output, as long as constant controlled pressure is supplied from the pump. However, as already described when referring to the motor configuration of FIGURE 3, once the demand of the fluid motors exceeds the maximum output potential of the variable flow pump, the pressure supplied to the motor ports will drop. Decrease in pressure will proportionally decrease the force generated on reaction piston 157 to a point where it will not be able to support preload of the motor spring 145. This will result in the rotation of motor trunnion 136 toward a position of reduced motor displacement, reduced motor torque and increased motor r.p.m. Therefore in this system, once the maximum variable pump flow capacity is reached, the pump will supply a constant maximum flow. Then the fluid motors will automatically start reducing their displacement, working within the constant horsepower range and maintaining the product of output torque and shaft speed approximately constant. Therefore within the automatic control range the fluid power drive will have the following output horsepower characteristics.

The power output of the drive will vary while maintaining a constant torque output within the maximum flow capacity of the variable flow pump. Once this maximum capacity is reached, the system will supply the constant maximum horsepower output, the torque output of the transmission being inversely proportional to the output speed. While using, in the system shown in FIGURE 2, variable fluid motors of FIGURE 4, the drive will retain forward and reverse characterstcis without the use of a four way reversing valve. Through the solenoids 180 the drive could be switched from forward to reverse driving without stopping the vehicle. At the same time, the drive would retain extended speed range characteristics both in the forward and the reverse drive zone of operation. Because of the reversing principle, this drive will use only one high pressure line, since the port 53 will always be the high pressure motor port and port 56 will always be the low pressure motor port. The use of the unloading mechanism of the variable displacement pump will automatically result in bringing the motors into zero displacement position, thus eliminating the necessity of clutches between motors and wheels of the tractor.

Referring now back to FIGURE 2, and using the variable displacement fluid motors of FIGURE 4, the four way reversing valve 50a and solenoid 57 can be eliminated, the flexible duct 25 being directly joined to flexible duct 25a and flexible duct 26 to duct 26a. The high pressure fluid from high pressure timing port 37 is then transmitted through the high pressure flexible duct 25, ducts 51 and 52, to high pressure ports 53 of fluid motors 19. The automatic pump control, within the maximum variable pump capacity, will supply flow to the high pressure ports 53 to maintain a constant fluid pressure at ports 53. The flow of high pressure fluid will bring the variable displacement mechanism of the fluid motors into maximum displacement position and generate rotary motion in fluid motors. This rotation is transmitted through the gear reducers 18 to the wheels 17. The high pressure fluid, after performing work in driving of wheels 17, is exhausted from low pressure port 56 and through ducts 55, 54, and low pressure flexible duct 26, and is returned to low pressure timing port 38. With this arrangement, the speed of rotation of front wheels 17 is dictated by the surface speed of the tractor, which is driven by the rear wheels 15, connected through the mechanical transmission to engine 12. When driving in the speed range up to the point where the maximum pump capacity is reached, the driving torque developed by the fluid motors and transmitted to the steering wheels is directly proportional to the system pressure and therefore controlled by the preload in the valve spring 71. At the tractor surface speeds higher than those equivalent to the maximum pump displacement the system pressure is no longer controlled by the pump control but by the characteristics of fluid motor controls and particularly the characteristics of the motor springs. In this zone of operation, when the pump is at maximum displacement, the torque developed by the fluid motors and transmitted to the steering wheels is inversely proportional to the surface speed of the tractor. The torque developed at the steering wheels helps to propel the tractor. The speed of rotation of the steering wheels, under conditions when the traction resistance encountered at the steering wheels is higher than the torque supplied by the fluid motors, is solely dictated by the speed of rotation of the rear wheels 15. Under these conditions, both the rear wheels 15 and steering wheels 17 are functionally synchronized by the ground surface. Therefore, as long as the traction resistance wholly contains the torque developed at the steering wheels by the fluid motors, the higher the surface speed of the tractor, the higher the speed of rotation of the steering wheels 17 and the larger the flow of high pressure fluid required by the fluid motors 19 up to the point where the fluid demand of motors exceeds the maximum output of the variable flow pump. Once this point is reached the flow demand of the fluid motors remains constant and the motors automatically reduce their displacement to match with the increasing speed of rotation of the steering wheels. Also, a sudden loss of traction at one of the front wheels will automatically bring the pump to its maximum displacement position, accelerating the unloaded wheel. As the speed of rotation of the unloaded wheel increases, with corresponding decrease in the displacement of the motor driving the unloaded wheel, the second wheel will develop a traction effort equivalent to comparatively high system pressure, thus preventing unloading of the fluid drive through the action of the hydraulic differential. Due to the feature of automatic reduction in displacement of the fluid motors, with reduction in system pressure, loss of traction at any of the hydraulically driven wheels will not unload the transmission.

In FIGURES 3 and 4, system pressure directly reacts on the effective areas of pistons 118 and 159 acting against the biasing force of a spring. However, for some applications, it may be preferable to introduce between high pressure motor port and motor control piston a proportional pressure reducing control of a type as shown in the pump control 59 of FIGURE 2, or of other conventional designs well known in the art. Such a proportional pressure reducing valve would permit better selection of spring and effective control piston area and would permit closest matching of change in motor displacement with change in system pressure. However, such a control would add to the cost of the motor.

Although, axial piston motors are shown in the preferred and disclosed embodiments, the control concept of this invention is adaptable to other types of positive displacement variable motors. For example, in the case of a vane motor, the capacity is changed by changing the stator eccentricity. When adapting such a vane motor to the concept of this invention, a spring is provided to bias the stator toward minimum eccentricity, and therefore, minimum displacement; and, actuating means responsive to the pressure fluid at the inlet port opposing the spring would be arranged to urge the stator toward a position of maximum eccentricity, and therefore, maximum displacement. Those skilled in the art will readily see how the concept of this invention can be applied to other types of positive displacement motors, and the advantages of the preferred embodiment in the disclosed hydraulic system for tractor drives.

Although several embodiments of this invention have been shown and described, various adaptations and modifications can be made without departing from the scope of the appended claims.

What is claimed is:

1. A variable displacement fluid motor comprising, a housing having inlet and outlet ports, a shaft journalled in said housing, power generating means operably connected to said shaft disposed to translate fluid power of pressure fluid to mechanical torque and rotation, means to vary the torque capacity of the motor from a maximum in one direction of rotation of the shaft through a position of zero torque capacity to a maximum in the opposite direction of rotation of the shaft, spring biasing means disposed to urge the means to vary the torque capacity of the motor toward the position of zero displacement from positions on either side of the zero capacity, valving means to phase pressure fluid from said inlet port to said power generating means and to said outlet port, and fluid operated actuating means responsive to the pressure in said inlet port disposed to generate a force opposing the force of the spring biasing means to selectively urge said means to change the torque capacity of the motor to either of its positions of maximum capacity, whereby the torque capacity of the motor will vary responsive to the pressure at the inlet port, and the direction of rotation can be changed while maintaining given inlet and outlet ports.

2. The combination of claim 1 further characterized by means to completely contain the reaction forces of the spring biasing means on the housing when the means to vary the torque capacity of the motor is in a position of zero torque capacity.

3. The combination of claim 2 wherein said spring biasing means includes an assembly of a spring disposed between a pair of spring retainers, said assembly being mounted for limited slideable movement with respect to said housing.

4. The combination of claim 1 wherein said fluid operated actuating means includes means to generate force selectively in first and second opposite directions proportional to the fluid pressure at the inlet port.

5. The combination of claim 4 wherein said means to generate the force in opposite directions includes first and second opposed pressure surfaces, and means to selectively connect said first and second opposed surfaces to the pressure fluid.

6. A variable displacement fluid motor comprising, a housing having inlet and outlet ports, a cylinder barrel journalled for rotation in said housing, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate for tilting movement with respect to the axis of rotation of the cylinder barrel to change the torque capacity of the motor, said cam plate being tiltable from a position normal to the axis of rotation of the cylinder barrel to a maximum angle in one direction with respect to the axis of rotation and a maximum angle in the opposite direction with respect to the axis of rotation, spring biasing means disposed to urge the cam plate toward its position normal to the axis of rotation from tilted positions in either of said directions, and fluid operated actuating means responsive to the pressure in the inlet port disposed to generate a force opposing the force of the spring biasing means to selectively urge said cam plate to its maximum position in either of said directions, whereby the torque capacity of the motor will vary responsive to the pressure at the inlet port, and the direction of rotation can be changed while maintaining given inlet and outlet ports.

7. The combination of claim 6 further characterized by means to completely contain the reaction forces of the spring biasing means on the housing when the cam plate is in its position normal to the axis of rotation.

8. The combination of claim 7 wherein said spring biasing mans includes an assembly of a spring disposed between a pair of spring retainers, said assembly being mounted for limited slidable movement with respect to said housing.

9. The combination of claim 6 wherein said fluid operated actuating means includes means to generate force selectively in first and second opposite directions proportional to the fluid pressure at the inlet port.

10. The combination of claim 9 wherein said means to generate the force in opposite directions includes first and second opposed pressure surfaces, and means to selectively connect said first and second opposed surfaces to the pressure fluid.

11. A variable displacement fluid motor comprising, a housing having inlet and outlet ports, a cylinder barrel journalled for rotation in said housing, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate for tilting movement with respect to the axis of rotation of the cylinder barrel to change the torque capacity of the motor, said cam plate being tiltable from a position normal to the axis of rotation of the cylinder barrel to a maximum angle in one direction with respect to the axis of rotation and a maximum angle in the opposite direction with respect to the axis of rotation, spring biasing means disposed to urge the cam plate toward its position normal to the axis of rotation from tilted positions in either of said directions, said spring biasing means including means to completely contain the spring reaction forces on said housing when the cam plate is normal to the axis of rotation, and fluid operated actuating means responsive to the pressure in the inlet port disposed to generate a force opposing the force of the spring biasing means to selectively urge said cam plate to its maximum position in either of said directions, whereby the torque capacity of the motor will vary responsive to the pressure at the inlet port, and the direction of rotation can be changed while maintaining given inlet and outlet ports.

12. A variable displacement fluid motor comprising, a housing having inlet and outlet ports, a cylinder barrel journalled for rotation in said housing, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate for tilting movement with respect to the axis of rotation of the cylinder barrel to change the torque capacity of the motor, said cam plate being tiltable from a position normal to the axis of rotation of the cylinder barrel to a maximum angle in one direction with respect to the axis of rotation and a maximum angle in the opposite direction with respect to the axis of rotation, spring biasing means disposed to urge the cam plate toward its position normal to the axis of rotation from tilted positions in either of said directions, said spring biasing means including an assembly of a spring disposed between a pair of spring retainers, a bore in said housing mounting said spring retainers for limited sliding movement, said assembly and said bore being arranged to completely contain the spring reaction forces on the housing when the cam plate is in the position normal to the axis of rotation, and fluid operated actuating means responsive to the pressure in the inlet port disposed to generate a force opposing the force of the spring biasing means to selectively urge said cam plate to its maximum position in either of said directions, whereby the torque capacity of the motor will vary responsive to the pressure at the inlet port, and the direction of rotation can be changed while maintaining given inlet and outlet ports.

13. A variable displacement fluid motor comprising, a housing having inlet and outlet ports, a cylinder barrel journalled for rotation in said housing, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate for tilting movement with respect to the axis of rotation of the cylinder barrel to change the torque capacity of the motor, said cam plate being tiltable from a position normal to the axis of rotation of the cylinder barrel to a maximum angle in one direction with respect to the axis of rotation and a maximum angle in the opposite direction with respect to the axis of rotation, spring biasing means disposed to urge the cam plate toward its position normal to the axis of rotation from tilted positions in either of said directions, said spring biasing means including an assembly of a spring disposed between a pair of spring retainers, a bore in said housing mounting said spring retainers for limited sliding movement, said assembly and said bore being arranged to completely contain the spring reaction forces when the cam plate is in the position normal to the axis of rotation, and fluid operated actuating means responsive to the pressure in said inlet port, said actuating means including means to generate force selectively in first and second directions to oppose the force of the spring biasing means to urge the cam plate to its maximum position in the selected direction, whereby the torque capacity of the motor will vary responsive to the pressure at the inlet port, and the direction of rotation can be changed while maintaining given inlet and outlet ports.

14. The combination of claim 13 wherein said means to generate the force in first and second directions includes first and second opposed pressure surfaces and means to selectively connect said first and second surfaces to the pressure fluid.

15. A variable displacement fluid motor comprising, a housing having inlet and outlet ports, a cylinder barrel journalled for rotation in said housing, said cylinder barrel having cylinder bores and pistons mounted in said cylinder bores for reciprocation therein, valving means disposed to phase pressure fluid from said inlet port to said cylinder bores and to said outlet port, a cam plate disposed to operate against said pistons, means mounting said cam plate for tilting movement with respect to the axis of rotation of the cylinder barrel to change the torque capacity of the motor, said cam plate being tiltable from a position normal to the axis of rotation of the cylinder barrel to a maximum angle in one direction with respect to the axis of rotation and a maximum angle in the opposite direction with respect to the axis of rotation, spring biasing means disposed to urge the cam plate toward its position normal to the axis of rotation from tilted positions in either of said directions, said spring biasing means including an assembly of a spring disposed between a pair of spring retainers, a bore in said housing mounting said spring retainers for limited sliding movement, said assembly and said bore being arranged to completely contain the spring reaction forces on the housing when the cam plate is in the position normal to the axis of rotation, and fluid operated actuating means responsive to the pressure in said inlet port, said actuating means including a piston having first and second opposed pressure surfaces disposed to generate respectively forces in first and second directions in opposition to the force of the spring biasing means to urge the cam plate to its maximum position in the selected direction and means to selectively connect said first and second surfaces to the pressure fluid, whereby the torque capacity of the motor will vary responsive to the pressure at the inlet port, and the direction of rotation can be changed while maintaining given inlet and outlet ports.

16. The combination of claim 15 wherein the piston is slidably disposed in said housing.

17. The combination of claim 15 wherein said means to selectively connect said means to selectively connect the pressure fluid to the first and second surfaces includes selector valve means.

18. In a self-propelled vehicle having a frame, an engine and first and second sets of wheels mounted on said frame, driving means interposed between said engine and said first set of wheels, the combination therewith of a fluid power transmission and control system interposed between said engine and said second set of wheels comprising, a fluid pump, said pump having flow changing means and means to operate said flow changing means to maintain a substantially constant fluid discharge pressure within the capacity of the flow changing means, at least one fluid motor drivingly connected to said second set of wheels, each of said fluid motors having fluid ports operably connected to said pump, each of said motors having displacement changing means and means to operate said displacement changing means responsive to pressure changes below said constant discharge pressure, whereby the displacement of the motor will change the capacity of the pump has been exceeded.

19. In a self-propelled vehicle having a frame, an engine and first and second sets of wheels mounted on said frame, driving means interposed between said engine and said first set of wheels; the combination therewith of a fluid power transmission and control system interposed between said engine and said second set of wheels comprising, a fluid pump, said pump having flow changing means and means to operate said flow changing means to maintain a substantially constant discharge pressure within the flow capacity of said flow changing means, at least one fluid motor drivingly connected to said second set of wheels, each of said fluid motors having fluid ports operatively connected to said pump, each of said motors having displacement changing means and means to operate said displacement changing means responsive to pressure changes below said constant discharge pressure, the displacement changing means of each of said motors including biasing means arranged to bias said displacement changing means toward a position of minimum displacement whereby the displacement of the motor will change when the capacity of the pump has been exceeded.

20. In a self-propelled vehicle having a frame, engine and driving wheels constituting a first set of wheels mounted on said frame, driving means interposed between said engine and said driving wheels, steering wheels constituting a second set of wheels pivotally mounted on said frame; the combination therewith of a fluid power transmission and control system interposed between said engine and said second set of wheels comprising, a fluid pump, said pump having flow changing means and means to operate said flow changing means to maintain a substantially discharge pressure within the flow capacity of said flow changing means, at least one fluid motor drivingly connected to said second set of wheels, each of said fluid motors having fluid ports operatively connected to said pump, each of said motors having displacement changing emans responsive to pressure changes below the constant discharge pressure, the displacement changing means of each of said motors including biasing means arranged to bias said displacement changing means toward a position of minimum displacement whereby the displacement of the motor will change when the capacity of the pump has been exceeded.

21. In a self-propelled vehicle having a frame, engine and driving wheels mounted on said frame, driving means interposed between said engine and said driving wheels, steering wheels pivotally mounted on said frame, the combination therewith of a fluid power transmission and control system disposed to power said steering wheels, comprising, fluid motor means mounted on said steering wheels and drivingly engaged therewith, said fluid motor means having first and second fluid ports and means to vary the effective torque capacity thereof, biasing means normally urging the means to vary the torque capacity toward a position of minimum capacity, fluid actuating means disposed to urge said means to vary the torque capacity toward a position of maximum capacity, a variable flow pump carried by said vehicle, said pump having inlet and outlet ports, duct means between said variable flow pump ports and said ports of said fluid motor means, said variable flow pump having a flow changing means and pressure responsive control means to operate said flow changing means to vary flow of pressure fluid from said variable flow pump to said fluid motor means to maintain a relatively constant system pressure at said motor ports within the flow capacity of said flow changing means whereby the effective torque capacity of the motor means will be varied upon change in system pressure below said constant discharge pressure.

22. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, fluid motor means mounted on said steering wheels and drivingly engaged therewith, said fluid motor means having first and second fluid ports and means to vary the effective torque capacity thereof, biasing means normally urging the means to vary the capacity toward a position of minimum capacity, fluid actuating means disposed to urge said means to vary the capacity toward a position of maximum capacity, a variable flow pump driven by said engine, fluid conducting means between said pump and said motor means, said variable pump having a flow changing mechanism, pump spring biasing means arranged to bias said flow changing mechanism toward a position of maximum flow, pump fluid actuating means arranged to oppose said pump spring biasing means, and pressure responsive control means disposed to operate said pump fluid actuating means to vary flow of pressure fluid from said pump to said fluid motor means to maintain a relatively constant system pressure within the flow capacity of said flow changing mechanism at said motor ports whereby the effective torque capacity of the motor means will be varied upon change in system pressure below said constant discharge pressure.

23. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, fluid motors mounted on each of said steering wheels and drivingly engaged therewith, each of said fluid motors having first and second fluid ports and displacement changing means, spring biasing means normally urging said displacement changing means toward a position of minimum displacement, fluid actuating means disposed to urge said displacement changing means toward a position of maximum displacement, said fluid actuating means having means responsive to pressure in said fluid ports of each of said motors, a variable flow pump driven by said engine, fluid conducting means between said pump and each of said motors, said variable pump having a flow changing mechanism, pump spring biasing means arranged to bias said flow changing mechanism toward a position of maximum flow, pump fluid actuating means arranged to oppose said pump spring biasing means, and pressure responsive control means disposed to operate said fluid actuating means to vary flow of pressure fluid from said pump to each of said fluid motors to maintain a relatively constant system pressure within the flow capacity of said flow changing mechanism at said motor ports whereby the displacement of the motors will change when the capacity of the pump has been exceeded.

24. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, fluid motors mounted on each of said steering wheels and drivingly engaged therewith, each of said fluid motors having first and second fluid ports and displacement changing means, spring biasing means normally urging said displacement changing means toward a position of minimum displacement, fluid actuating means disposed to urge said displacement changing means toward maximum displacement position, said fluid actuating means having means responsive to pressure in said fluid ports of each of said motors, a variable flow pump driven by said engine, fluid conducting means between said pump and said motors, said variable pump having a flow changing mechanism, pump spring biasing means arranged to bias said flow changing mechanism toward the position of maximum flow, pump fluid actuating means arranged to oppose said pump spring biasing means, and pressure responsive control means disposed to operate said fluid actuating means to vary flow of pressure fluid from said variable flow pump to said fluid motors to maintain a relatively constant system pressure within the flow capacity of said flow changing mechanism at said motor ports, and variable flow pump unloading means to selectively bring said flow changing mechanism toward position of zero pump flow, whereby said unloading means will unload said fluid drive bringing said variable flow pump and said variable flow motors into position of zero flow and zero displacement.

25. The combination of claim 24 wherein said unloading means includes a source of control pressure fluid, and selector valve means disposed to selectively connect said unloading means with said source of control pressure fluid.

26. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, a variable flow pump driven by said engine, said variable flow pump having a flow changing means and pump spring biasing means disposed to bias said flow changing means toward the position of maximum flow, fluid actuating means arranged to oppose said pump spring biasing means, pressure responsive control means disposed to operate said fluid actuating means to vary flow of pressure fluid from said variable flow pump to maintain a relatively constant system pressure within the maximum flow capacity of said flow changing means, fluid motors mounted on said steering wheels and drivingly engaged therewith, said fluid motors having first and second fluid ports connected to said pump, said motors having displacement changing means and spring biasing means urging said displacement changing means toward a minimum displacement position, and fluid actuating means arranged to bias said dispacement changing means of said motors toward a maximum displacement position, first and second duct means between said actuating means and said first and second ports, and first and second check valve means to permit passage of the high pressure fluid to said fluid actuating means from one of said fluid ports while isolating other port, whereby a selectively constant system pressure will be maintained at the motor ports within the flow changing capacity of said pump whereby the displacement of the motors will change when the capacity of the pump has been exceeded.

27. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, a variable flow pump driven by said engine, said variable pump having flow changing means and pump spring biasing means disposed to bias said flow changing means toward position of maximum flow, fluid actuating means arranged to oppose said pump spring biasing means, pressure responsive control means disposed to operate said fluid actuating means to vary flow of pressure fluid from said variable flow pump to maintain a relatively constant system pressure within the maximum flow capacity of said flow changing means from said pump, a fluid motor mounted on each of said steering wheels and drivingly engaged therewith, each of said fluid motors having first and second fluid ports connected to said pump, each of said motors having displacement changing means and spring biasing means arranged to bias said displacement changing means toward the minimum displacement position, each of said motors having fluid actuating means arranged to bias said displacement changing means toward a maximum displacement position, said fluid actuating means having means responsive to pressure in said motor fluid ports, said means responsive to pressure of said fluid motor having force generating means arranged to maintain said displacement changing means of said motors in the maximum displacement position against the biasing force of said spring biasing means of the motors when said variable flow pump supplies a relatively constant fluid pressure to said fluid motors, whereby with variable flow pump working at less than its flow capacity the fluid motors will be maintained at their maximum displacement and when the capacity of the pump has been exceeded the motors will reduce their displacement.

28. The combination of claim 27 further characterized by duct means between the fluid actuating means of each motor and the ports of the respective motor, and check valve means disposed to permit passage of the high pressure fluid from one of said ports which is the high pressure port to said fluid actuating means of the motor and to isolate the other motor port.

29. The combination of claim 28 wherein said motors are axial piston motors and the means to change the displacement thereof includes a tiltable cam plate.

30. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, a variable flow pump driven by said engine and having inlet and outlet ports, said variable flow pump having flow changing means and pressure responsive control means to operate said flow changing means to vary flow of pressure fluid from said variable flow pump to maintain a relatively constant system pressure, within the flow capacity of said flow changing means, fluid motors mounted on each of said steering wheels and drivingly engaged therewith, each of said fluid motors having an inlet and an outlet port connected to said pump, each of said motors having displacement changing means and spring biasing means disposed to bias said displacement changing means toward a minimum displacement position, and each motor having fluid actuating means arranged to selectively bias said displacement changing means toward maximum displacement position in one direction of motor rotation or the opposite direction of motor rotation, whereby direction of rotation of said fluid motors can be reversed through said displacement changing means while said variable flow pump maintains a relatively constant pressure at the motor inlet ports and the displacement of said motors will change when the capacity of the pump flow changing means is exceeded.

31. The combination of claim 30, wherein said fluid actuating means of each of said motors includes first and second force generating means, said first force generating means being disposed to urge the displacement changing means of its respective motor toward maximum displacement in one direction of rotation of the motor, and said second force generating means being disposed to urge the displacement changing means of its respective motor toward maximum displacement in the opposite direction of rotation of the motor.

32. The combination of claim 31, further characterized by each of said motors having selector valve means disposed to selectively connect said first and second force generating means to the high pressure port of its respective motor.

33. The combination of claim 32, wherein each of said first and second force generating means of each of said motors is configured and arranged to supply sufficient force to the displacement changing means in its respective direction of its respective motor to maintain the displacement changing means in its maximum position when the pump maintains a given constant pressure level.

34. The combination of claim 33 wherein each of said motors is an axial piston motor and the displacement changing means of each motor includes a tiltable cam plate.

35. The combination of claim 33 further characterized by the spring biasing means of each motor including spring means, each of said motors having a housing and means to guide said spring means in respect to said housing, means to contain biasing force of each of said motor springs on its respective housing when the displacement changing means is urged in either direction, whereby said spring biasing means will bias said displacement changing means toward position of minimum displacement with motor working in either direction of rotation.

36. The combination of claim 33 further characterized by said fluid actuating means of each motor including a piston slidably disposed in a cylinder, said piston functionally dividing said cylinder into two zones, and connecting means connecting said piston and said displacement changing means, whereby introduction of pressure fluid to either of the zones will generate a force biasing said displacement changing means in corresponding direction.

37. The combination of claim 36 further characterized by the effective cross-section area of said piston of each motor being so selected that force generated on said effective area by a relatively constant preselected pressure supplied by said variable flow pump will be greater than the opposing force of said spring actuating means, whereby force generated on said piston will bring said displacement changing mechanism into maximum displacement position.

38. The combination of claim 36 further characterized by said piston of each motor having first effective force generating area and a second effective force generating area, said second area being twice as large as the first area, and duct means connecting said first area with said inlet motor port, and valve means arranged to selectively connect said second area with low pressure zone and motor inlet port, whereby said displacement means can be biased toward one or the opposite direction of rotation.

39. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, a variable flow pump driven by said engine, said variable flow pump having a flow changing means, pump spring biasing means arranged to bias said flow changing means toward a position of maximum flow, fluid actuating means arranged to oppose said pump spring biasing means, and pressure responsive control means to operate said fluid actuating means to vary the flow of pressure fluid from said variable flow pump to maintain a relatively constant selected system pressure within the flow capacity of said flow changing means, a fluid motor mounted on each of said steering wheels and drivingly engaged therewith, each of said fluid motors having an inlet and an outlet port connected to said pump and displacement changing means, each of said motors having spring biasing means arranged to bias said displacement changing means thereof toward the minimum displacement position and fluid actuating means arranged to selectively bias said displacement changing means thereof toward the maximum displacement position in a first direction for one direction of motor rotation and a second direction for the opposite direction of motor rotation, said fluid actuating means of each motor having first and second force generating means, said first force generating means arranged to bias said displacement changing means of its motor toward the maximum displacement position in said first direction, said second force generating means arranged to bias said displacement changing means of its motor toward the maximum displacement position in said second direction, each of said motors having reversing valve means arranged to selectively connect said first and said second force generating means of said fluid actuating means with the inlet port of the respective motor, said first and second force generating means of each of said fluid motors being arranged to supply sufficient force to maintain said displacement changing mechanism in the maximum displacement position in either direction against the biasing force of said spring biasing means of each of said motors to maintain said variable flow motors in maximum displacement position when said variable flow pump maintains relatively constant given pressure at said inlet motor ports, whereby direction of rotation of said fluid motors can be reversed through said displacement changing mechanism while said variable flow pump maintains a relatively constant pressure at said inlet motor ports and the displacement of said motors will change when the capacity of the pump flow changing means is exceeded.

40. The combination of claim 39 wherein each of said motors are axial piston motors, and the displacement changing means of each includes a tiltable cam plate.

41. In a self-propelled vehicle having a frame, engine and driving wheels mounted on said frame, driving means interposed between said engine and said driving wheels, steering wheels pivotally mounted on said frame, the combination therewith of a fluid power transmission and control system interposed between said engine and said steering wheels comprising, a variable flow pump driven by said engine, said variable pump having a flow changing means, pump spring biasing means arranged to bias said flow changing means toward a position of maximum flow, fluid actuating means arranged to oppose said pump spring biasing means, and pressure responsive control means to operate said fluid actuating means to vary the flow of pressure fluid from said variable flow pump to maintain a relatively constant selected system pressure within the flow capacity of said flow changing means, a fluid motor mounted on each of said steering wheels and drivingly engaged therewith, each of said fluid motors having an inlet and an outlet port connected to said pump and displacement changing means, each motor having spring biasing means arranged to bias said displacement changing means toward the minimum displacement position and fluid actuating means arranged to selectively bias said displacement changing mechanism toward maximum displacement position in a first direction for one direction of motor rotation and a second direction for the opposite direction of motor rotation, said fluid actuating means of each motor having first and second force generating means, said first force generating means arranged to bias said displacement changing means of its motor toward the maximum displacement position in said first direction, said second force generating means arranged to bias said displacement changing means of its motor toward the maximum displacement position in said second direction, each of said motors having reversing valve means arranged to selectively connect said first and said second force generating means of said fluid actuating means with the inlet port, and variable flow pump unloading means to selectively bring said flow changing means of said pump toward the position of zero pump flow, whereby said unloading means will unload said fluid drive bringing said variable flow pump and said variable flow motors into position of zero flow and zero displacement.

42. The combination of claim 41 wherein unloading means for the pump includes a source of control pressure and selector valve means to selectively connect said unloading means with said source of control pressure.

43. A fluid power transmitting circuit comprising, a variable flow fluid pump, a variable fluid motor connected to said pump, said motor including power generating means and control means, said control means including means to vary the capacity of the power generating means, biasing means normally urging said means to vary the capacity of the motor into minimum torque output position, fluid pressure responsive actuating means disposed to oppose said biasing means and urge said motor into maximum torque output position, whereby at pressure levels at or above a given level the capacity of the motor will be a maximum and the torque capacity of the motor will be reduced with reduction in the pressure delivered to said fluid pressure responsive actuating means.

44. The combination of claim 43 wherein said pump includes pressure responsive regulating means, whereby within the maximum pump capacity the motor will develop constant torque at variable power levels and when the pump reaches maximum capacity the motor will develop a substantially constant horsepower at varying torque output.

45. The combination of claim 44 wherein the motor is an axial piston motor having a cam plate, and said means to vary the capacity of the motor includes means to tilt said cam plate.

46. The combination of claim 45 wherein said cam plate is tiltable from a position of minimum capacity normal to the motor axis to a position of maximum capacity in only one direction, and said circuit includes means to reverse the flow from said pump to one of two selected motor fluid ports.

47. The combination of claim 45 wherein said cam plate is tiltable from a position of minimum torque capacity normal to the motor axis to maximum capacities in a first direction for one direction of rotation and in a second direction for rotation in the opposite direction, whereby reverse in direction of the motor can be accomplished without reversing the polarity of motor fluid ports.

48. The combination of claim 44 wherein said fluid pressure responsive actuating means is responsive to the pressure at the inlet port of the motor.

References Cited
UNITED STATES PATENTS

| | | | |
|---|---|---|---|
| 2,409,185 | 10/1946 | Blasutta | 91—199 |
| 2,478,481 | 8/1949 | Griffith | 91—199 |
| 2,562,835 | 10/1950 | Tucker | 60—53 |
| 2,667,862 | 2/1954 | Muller | 91—199 |
| 2,731,569 | 1/1956 | Cardillo et al. | |
| 3,053,043 | 9/1962 | Knowler. | |
| 3,063,381 | 11/1962 | Budzich. | |
| 3,209,539 | 10/1965 | Kuze. | |

FOREIGN PATENTS

| | | |
|---|---|---|
| 576,420 | 4/1946 | Great Britain. |
| 791,903 | 3/1958 | Great Britain. |
| 877,343 | 9/1961 | Great Britain. |

BENJAMIN HERSH, *Primary Examiner.*

MILTON L. SMITH, *Examiner.*

UNITED STATES PATENT OFFICE
CERTIFICATE OF CORRECTION

Patent No. 3,339,660                      September 5, 1967

Tadeusz Budzich

It is hereby certified that error appears in the above numbered patent requiring correction and that the said Letters Patent should read as corrected below.

Column 1, line 59, after "applications" strike out the period; column 14, line 64, for "change the" read -- change when the --; column 15, line 23, for "substantially discharge" read -- substantially constant discharge --; line 28, for "emans" read -- means --.

Signed and sealed this 25th day of February 1969.

(SEAL)
Attest:

Edward M. Fletcher, Jr.
Attesting Officer

EDWARD J. BRENNER
Commissioner of Patents